US008929259B2

(12) United States Patent
Banerjee et al.

(10) Patent No.: US 8,929,259 B2
(45) Date of Patent: Jan. 6, 2015

(54) QUALITY OF SERVICE FOR WLAN AND BLUETOOTH COMBINATIONS

(75) Inventors: Kaberi Banerjee, San Jose, CA (US); Gunnar Nitsche, Radebeul (DE)

(73) Assignee: NXP, B .V., Eindhoven (NL)

( * ) Notice: Subject to any disclaimer, the term of this patent is extended or adjusted under 35 U.S.C. 154(b) by 204 days.

(21) Appl. No.: 13/453,706

(22) Filed: Apr. 23, 2012

(65) Prior Publication Data

US 2012/0207143 A1 Aug. 16, 2012

Related U.S. Application Data

(62) Division of application No. 12/520,293, filed as application No. PCT/IB2007/055268 on Dec. 21, 2007, now Pat. No. 8,184,582.

(60) Provisional application No. 60/876,782, filed on Dec. 21, 2006.

(51) Int. Cl.
    *H04B 7/005* (2006.01)
    *H04W 16/14* (2009.01)
    *H04W 74/08* (2009.01)

(52) U.S. Cl.
    CPC .............. H04W 16/14 (2013.01); H04W 74/08 (2013.01)
    USPC ............................ 370/278; 370/338; 455/450

(58) Field of Classification Search
    USPC ......... 370/277–278, 328–330, 338, 345, 350; 455/450–452.2
    See application file for complete search history.

(56) References Cited

U.S. PATENT DOCUMENTS

| | | | |
|---|---|---|---|
| 7,406,296 B2 | 7/2008 | Haartsen | |
| 7,414,986 B2 * | 8/2008 | Kandala et al. | 370/310 |
| 7,508,781 B2 * | 3/2009 | Liu et al. | 370/311 |
| 7,899,396 B2 | 3/2011 | Meylan et al. | |
| 2005/0271010 A1 | 12/2005 | Capretta | |
| 2005/0276241 A1 * | 12/2005 | Kamerman et al. | 370/328 |
| 2006/0215601 A1 * | 9/2006 | Vleugels et al. | 370/328 |
| 2006/0274704 A1 * | 12/2006 | Desai et al. | 370/338 |
| 2006/0292986 A1 * | 12/2006 | Bitran et al. | 455/41.2 |
| 2007/0002782 A1 | 1/2007 | Kneckt et al. | |
| 2007/0066222 A1 * | 3/2007 | Tao et al. | 455/41.2 |
| 2007/0177542 A1 | 8/2007 | Hirsch | |
| 2008/0101320 A1 * | 5/2008 | Krahn et al. | 370/342 |
| 2008/0144597 A1 * | 6/2008 | Chen | 370/345 |
| 2010/0039973 A1 | 2/2010 | Cavalcanti et al. | |

FOREIGN PATENT DOCUMENTS

EP    1 729 463 A1    12/2006
WO    2005/067212 A1    7/2005

OTHER PUBLICATIONS

IEEE 802.15.2 part 15.2—Coexistence of Wireless Personal Area Networks With Other Wireless Devices . . . , 43 pgs. (2003).

(Continued)

*Primary Examiner* — Jeffrey M Rutkowski

(57) ABSTRACT

A hybrid device includes both an IEEE-802.11e type WLAN client station (QAP) and a BLUETOOTH piconet unit interconnected such that the BLUETOOTH transmissions are scheduled to occur according to a transmission opportunity (TXOP) that was granted by a quality of service (QoS) access point (QAP) in a basic service set (BSS). Requests for BLUETOOTH traffic are handled by the associated QSTA which generates an add traffic service (ADDTS) to the QAP.

10 Claims, 4 Drawing Sheets

(56) References Cited

OTHER PUBLICATIONS

Godfrey, T., et al., GlobespanVirata "Making QoS a Reality over WLAN Connections," retrieved from the Internet at www.eetimes.com/General/PrintView/4009268, 53 pages. (Dec. 2003).

Singh, H., et al.; "Enhanced Power Saving in Next Generation Wireless LANs", IEEE Veh. Techn. Conf. 2006, 5 pgs. (2006).

International Search Report for European Patent Application PCT/IB2007/055268 (Dec. 21, 2007).

* cited by examiner

QUALITY OF SERVICE FOR WLAN AND BLUETOOTH COMBINATIONS

CROSS-REFERENCE TO RELATED APPLICATIONS

This application is a divisional of copending U.S. patent application Ser. No. 12/520,392, filed on Jun. 25, 2009, which is a 371 of international patent application PCT/IB2007/055268, filed on Dec. 21, 2007, which claims the benefit of U.S. provisional patent application No. 60/876,782, filed on Dec. 21, 2006.

FIELD OF THE INVENTION

This invention relates to wireless communications systems, and more particularly to co-located BLUETOOTH and WLAN devices that must share communication resource access.

BACKGROUND

Hand held devices are now becoming a hub for personal communication and individual mobile computing needs. It is a centre for the convergence of multiple media types and multiple networking standards that are best suited to transport a specific types of data.

BLUETOOTH (IEEE-802.15.1 Industry Standard) and wireless local area network (WLAN) networking (IEEE-802.11 a/b/g Industry Standards) have been used extensively in hand-held personal communication devices. A Packet Traffic Arbitration (PTA) algorithm for time division multiple access (TDMA) has been used quiet successfully to allow two networks, such as WLAN and BLUETOOTH, to be collocated with sufficient throughput on both to support useful communication.

But the throughput requirements of such networks has been expanding in step with market needs. The throughput increases on each of the networks, means increased wireless medium traffic reservation periods, e.g., IEEE-802.11n for WLAN, and Extended Data Rate (EDR) extensions for BLUETOOTH.

The PTA algorithm relies heavily on there being enough quite time in both networks to deliver whole frames without errors. However, the frequency and duration of quiet periods is reduced in advanced IEEE-802.11n networks. So, it becomes necessary for each network to recognize the medium reservation requirements of the other collocated network.

Typically, the PTA algorithm uses hardware signaling methods to reserve the medium, either for WLAN or BLUETOOTH traffic. Such reservation scheme presupposes that the WLAN Station will have a sufficient number and duration of quiet periods to allow asynchronous and isochronous BLUETOOTH traffic.

However, new standards like the IEEE-802.11n allow aggregated frame transfers of MAC service and protocol data units. Such can result in a serious depletion of the number of available WLAN quiet periods. The WLAN medium access windows can be as long as a few milliseconds, especially with hand-held devices that operate at under 100 Mbps/second transfer rates.

BLUETOOTH isochronous transfers need quiet periods that are at least 2.5 milliseconds long. It is getting increasingly more difficult in newer devices to accommodate the error-free transfer of IEEE-802.11n frames while still supporting BLUETOOTH traffic. The errors caused by the collision of needs to access the medium results in a larger number of retrials and corresponding inefficiencies.

Some background in WLAN IEEE-802.11 developments would be helpful in understanding the present invention. Tim Godfrey, Globespan Virata, in a COMMSDESIGN article dated Dec. 19, 2003, explains that a hybrid coordination function (HCF) in the IEEE-802.11e Standard replaces the IEEE-802.11-legacy distributed coordination function (DCF) and point coordination function (PCF) in a quality of service (QoS) station (QSTA). See, Commdesign web site. The HCF includes two access mechanisms, an enhanced distributed channel access (EDCA), and an HCF controlled channel access (HCCA). The HCF defines a uniform set of frame exchange sequences that are usable at any time, and allocates rights to transmit with transmit opportunities (TXOPs) granted to QSTA's through the channel access mechanisms. Each TXOP grants a particular QSTA the right to use the medium at a defined point in time, and for a defined maximum duration. The allowed duration of TXOP's are communicated globally in the EDCA station beacon.

The HCF introduced new acknowledgement (ACK) rules. Before, every unicast data frame required an immediate response with an ACK control frame. Now, HCF allows either no-acknowledgement, or block-acknowledgement, and which to use is specified in a QoS data frame control field. The no-acknowledgement is useful in applications with very low jitter tolerance, e.g., streaming multimedia, where retry delays would make the data unusable. Block-acknowledgements can increase efficiency by aggregating the ACK's for multiple received frames into a single response.

In EDCA, the contention window and backoff times are adjusted to favor higher priority classes gaining medium access. Eight user priority levels are available, and each priority is mapped to an "Access Category", which corresponds to one of four transmit queues. Each queue provides frames to an independent channel access function, each of which implements the EDCA contention algorithm. When frames are available in multiple transmit queues, contention for the medium occurs both internally and externally, based on the same coordination function. The internal scheduling resembles the external scheduling. Internal collisions are resolved by allowing frames with the higher priority to transmit, while the lower priority frames are subjected to a queue-specific backoff as if a collision had occurred.

The minimum idle delay before contention, the minimum and maximum contention windows, and other parameters defining EDCA operation are stored locally by the QSTA. Such parameters can be different for each access category (queue), and can be individually updated for each access category by a QoS access point (QAP) through the EDCA parameter sets. The parameters are sent from the QAP as part of the beacon, and in probe and re-association response frames. The stations in the network can then be adjusted to changing conditions, and the QAP can manage the overall QoS.

Under EDCA, stations and access points use the same access mechanism and contend on an equal basis at a given priority. A station that wins an EDCA contention is granted a transmit opportunity (TXOP), the right to use the medium for a period of time. The duration of each TXOP is specified per access category, and is included in the TXOP limit field of the access category (AC) parameter record in the EDCA parameter set. A QSTA can use a TXOP to transmit multiple frames within an access category.

If a frame exchange sequence has been completed, and there is still time remaining in the TXOP, the QSTA can extend the frame exchange sequence by transmitting another frame in the same access category. The QSTA must ensure that the transmitted frame and any necessary acknowledgement can fit into the time remaining in the TXOP.

the IEEE-802.11-type contention-based medium access is susceptible to severe performance degradation when overloaded. In overload conditions, the contention windows become large, and more and more time is spent in backoff delays rather than sending data. Admission control in the IEEE-802.11e networks regulates the amount of data contending for the medium.

IEEE-802.11e is an enhancement of the IEEE-802.11a and IEEE-802.11b wireless LAN (WLAN) specifications. It offers quality of service (QoS) features, including the prioritization of data, voice, and video transmissions. The IEEE-802.11a, IEEE-802.11b, and IEEE-802.11e standards are elements of the IEEE-802.11 family of specifications for wireless local area networks.

IEEE-802.11e enhances the IEEE-802.11 Media Access Control layer (MAC layer) with a coordinated time division multiple access (TDMA) construct, and adds error-correcting mechanisms for delay-sensitive applications such as voice and video. The IEEE-802.11e specification enables seamless interoperability and is especially well suited for use in networks that include multimedia capability. It supports high-speed Internet access with full-motion video, high-fidelity audio, and Voice over IP (VoIP).

IEEE-802.11e networks operate in two ranges, 2.400-2.4835 GHz (the same as IEEE-802.11b networks), or 5.725 GHz to 5.850 GHz (the same as IEEE-802.11a networks). There arc certain advantages to the higher frequency range, including faster data transfer speed, more channels, and reduced susceptibility to interference.

The four basic parts of a BLUETOOTH system are a radio frequency (RF) unit, a baseband or link control unit, link management software, and the supporting application software.

The BLUETOOTH radio is a short-distance, low-power radio operating in the unlicensed spectrum of 2.4-gigahertz (GHz). The radio uses a nominal antenna power of 0-dBm (1-mW) and has a range of 10 meters. Optionally, a range of 100 meters may be achieved by using an antenna power of 20-dBm (100-mW). Data is transmitted at a maximum rate of one megabit per second. However, communication protocol overhead limits the practical data rate to about 721-Kbps.

BLUETOOTH uses spectrum spreading, the transmission hops among seventy-nine different frequencies between 2.402-GHz and 2.480-GHz at nominal rate of 1600-hops/s. Spectrum spreading minimizes interference from other devices in the 2.4-GHz band, such other wireless networks. If a transmission encounters interference, it waits 625-microseconds for the next frequency hop and retransmits on a new frequency. Frequency hopping also provides data security because two packets of data are never sent consecutively over the same frequency, and the changing frequencies are pseudo-random.

The link controller handles all the BLUETOOTH baseband functions, e.g., encoding voice and data packets, error correction, slot delimitation, frequency hopping, radio interface, data encryption, and link authentication. It also executes the link management software.

The IEEE-802.11e Standard defines a hybrid coordination function (HCF) used in the quality of service (QoS) enhance basic service set (QBSS). The HCF has two modes of operation, enhanced distributed channel access (EDCA) and HCF controlled channel access (HCCA). EDCA can support prioritized traffic. EDCA is a contention-based channel access function, and HCCA is based on a polling mechanism, controlled by a hybrid coordinator (HC). The HC is co-located with the QoS enhanced access point (QAP). Both access functions enhance or extend functionality of the original IEEE-802.11 DCF and PCF access methods.

Two other elements introduced by the IEEE IEEE-802.11e MAC are the access category (AC) and transmission opportunity (TXOP) in the HCF. The TXOP reserves an interval of time when a particular QoS enhanced client station (QSTA) has the right to make frame exchanges over the wireless medium. The TXOP can be obtained using the contention-based channel access, e.g., an enhanced distributed access channel (EDCA) TXOP. The EDCA-TXOP is announced in the beacon frame transmitted by the QoS enhanced access point (QAP). The QSTA's each contend for MCA TXOP. The TXOP can also be granted by HCF controlled channel access (HCCA), it is a HCCA (polled) TXOP. The HCCA channel access method TXOP is included in the QoS poll frame transmitted to a QSTA by the QAP when it polls the QSTA to start frame transmission. Once a QSTA gets the medium access right, it is allowed to transmit multiple frames during its exclusive time slot.

Each station using the EDCA has four AC's, each with one transmit queue with an independent mechanism to contend for medium access. The four AC's have different priorities, and are intended for different kinds of traffic, e.g., background (AC BK), best effort (AC BE), video (AC VI), and voice (AC VO). The TXOP defines the starting time and maximum duration that a station may transmit frames.

In the IEEE IEEE-802.11e Standard, when a QSTA has a traffic stream (TS) such as an audio-video (AV) stream to transmit, it sends an add TS (ADDTS) request to QAP to ask for transmission permission for the TS before starting transmission. Such ADDTS request includes a traffic specification (TSPEC) which specifies the characteristics and QoS expectations of the TS, e.g., TS ID, data rate, data unit size, desired PHY rate, medium access method (EDCA or HCCA), etc. When the QAP receives the ADDTS request, it will evaluate the request in view of the TSPEC element, available bandwidth, channel condition, network loading, etc. If the bandwidth is available, the QAP will accept the request. The QAP transmits its decision with an ADDTS response to the requesting QSTA. If the request is accepted the QSTA shall start transmitting the TS. Otherwise, the QSTA shall not transmit the TS.

Each AC has its own transmit queue and its own set of AC parameters. The differentiation in priority between AC is realized by setting different values for the AC parameters. The most important of which are, Arbitrary inter-frame space number (AIFSN), The minimum time interval between the wireless medium becoming idle and the start of transmission of a frame; Contention Window (CW), A random number is drawn from this interval, or window, for the backoff mechanism; and, TXOP Limit, The maximum duration for which a QSTA can transmit after obtaining a TXOP. When data arrives at the MAC-UNITDATA service access point (SAP), the IEEE-802.11e MAC first classifies the data with the appropriate AC, and then pushes the newly arrived MSDU into the appropriate AC transmit queue. MSDUs from different ACs contend for EDCA-TXOP internally within the QSTA. The internal contention algorithm calculates the backoff, independently for each AC, based on AIFSN, contention window, and a random number. The backoff procedure is similar to that in DCF, and the AC with the smallest backoff wins the internal contention. The winning AC would then contend externally for the wireless medium. The external contention algorithm has not changed significantly compared to DCF, except that in DCF the deferral and backoff were constant for a particular PHY. IEEE-802.11e has changed the deferral and backoff to be variable, and the values are set according to the appropriate AC. With proper tuning of AC parameters, traffic performance from different ACs can be optimized and prioritization of traffic can be achieved. This requires a central coordinator (QAP) to maintain a common set of AC parameters to guarantee fairness of access for all QSTA within the QBSS. Also in order to address the asymmetry between uplink (QSTA to QAP) and the much heavier downlink (QAP to QSTA) traffic, a separate set of EDCA parameters is defined for the QAP only, which takes this asymmetry into account.

The traffic specification (TSPEC) is the traffic stream management device provides the management link between higher layer QoS protocols such as IntSery or DiffSery with the IEEE-802.11e channel access functions. TSPEC describes data rate, packet size, delay, and service interval. TSPEC negotiation between peer MAC layers provides the mechanism for controlling admission, establishment, adjustment and removal of traffic streams. Traffic stream admission control is especially important since there is limited bandwidth available in the wireless medium. Bandwidth access must be controlled to avoid traffic congestion, which can lead to breaking established QoS and drastic degradation of overall throughput. The IEEE-802.11e standard specifies the use of Traffic Specification (TSPEC) for such a purpose for both EDCA and HCCA.

QoS management frames, primitives, and procedures are defined for TSPEC negotiation, which is always initiated by the station management entity (SME) of a QSTA, and accepted or rejected by the HC. Requested TSPEC is communicated to the MAC via the MAC layer management entity (MLME) SAP. This allows higher layer SW, protocols, and application, such as RSVP, to allocate resources within the MAC layer.

Admission control is negotiated by the use of a TSPEC. A station specifies its traffic flow requirements (data rate, delay bounds, packet size, and others) and requests the QAP to create a TSPEC by sending the ADDTS (add TSPEC) management action frame. The QAP calculates the existing load based on the current set of issued TSPECs. Based on the current conditions, the QAP may accept or deny the new TSPEC request. If the TSPEC is denied, the high priority access category inside the QSTA is not permitted to use the high priority access parameters, but it must use lower priority parameters instead. Admission control is not intended to be used for the "best effort" and "background" traffic classes.

What is needed is a system that allows WLAN client stations (STA's) to recognize and declare the needs of BLUETOOTH traffic as one of the supported traffic streams to the Access Point of the WLAN network, and thus reserve medium time for BLUETOOTH traffic.

SUMMARY OF THE INVENTION

In an example embodiment, a hybrid wireless device includes both a IEEE-802.11e type WLAN client station (QAP) and a BLUETOOTH piconet unit interconnected such that the BLUETOOTH transmissions are scheduled to occur according to a transmission opportunity (TXOP) that was granted by a quality of service (QoS) access point (QAP) in a basic service set (BSS). Requests for BLUETOOTH traffic are handled by the associated QSTA which generates an add traffic service (ADDTS) to the QAP.

An advantage of the present invention is the co-interference that would otherwise be associated with a hybrid device combining WLAN and BLUETOOTH devices is reduced or totally eliminated.

Another advantage of the present invention is a method is provided for making error-free BLUETOOTH data transfers in the presence of WLAN devices.

A still further advantage of the present invention is a wireless device is provided for efficient use of its radio medium.

An advantage of the present invention is a method is provided that allows a WLAN STA to reserve medium time for a collocated BLUETOOTH traffic stream. The WLAN STA asks an Access Point of the WLAN network to accommodate the BLUETOOTH traffic as if it were a supported traffic stream.

The above summary of the present invention is not intended to represent each disclosed embodiment, or every aspect, of the present invention. Other aspects and example embodiments are provided in the figures and the detailed description that follows.

BRIEF DESCRIPTION OF THE DRAWINGS

The invention may be more completely understood in consideration of the following detailed description of various embodiments of the invention in connection with the accompanying drawings, in which.

Figure 1:
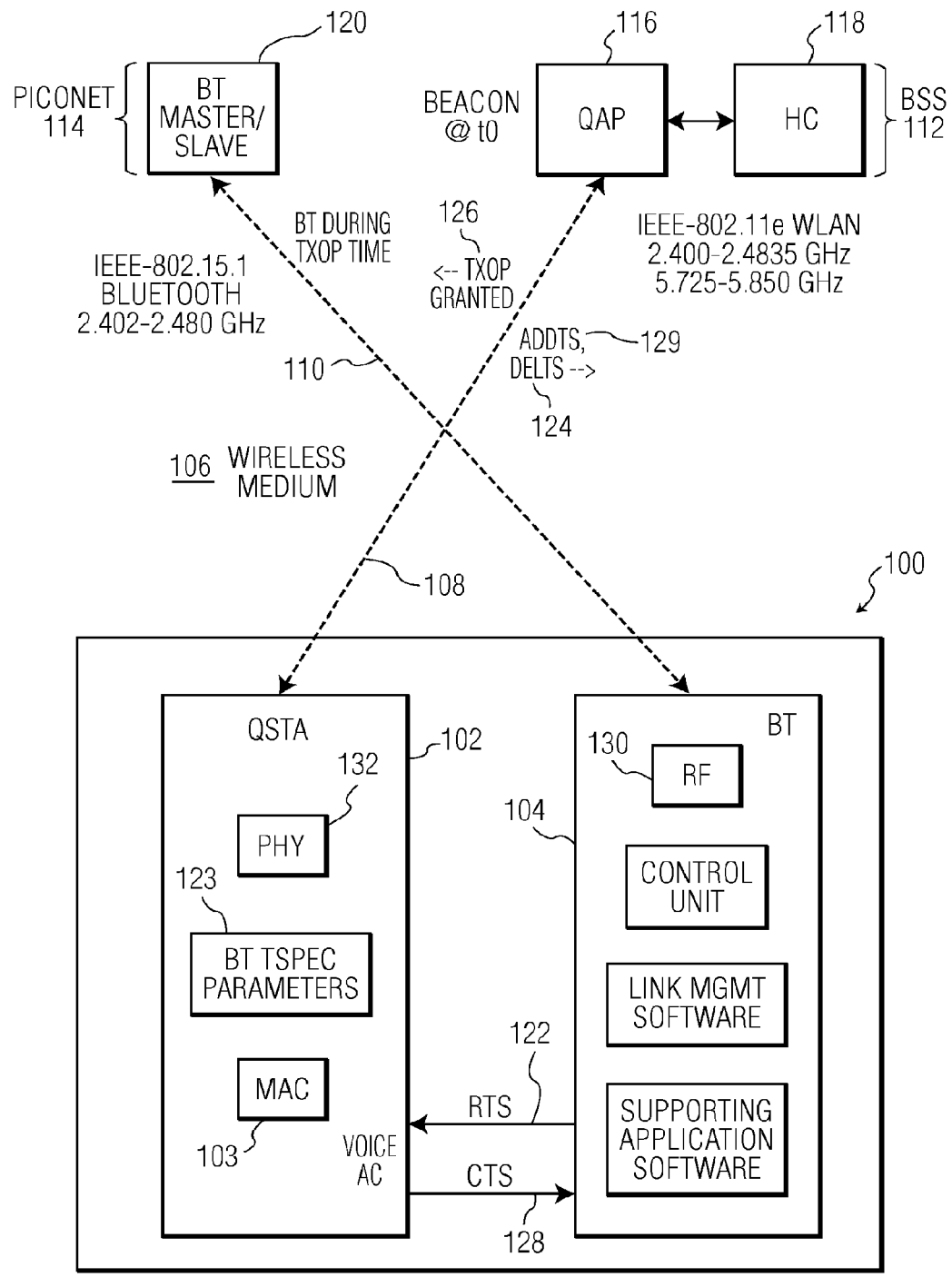
FIG. 1 is a functional block diagram of a hybrid WLAN and BLUETOOTH wireless device embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In FIG. 1, a single wireless hand-held device embodiment of the present invention, referred to herein by the general reference numeral 100, comprises a wireless local area network (WLAN) client station (Q STA) 102 with a media access control (MAC) 103 that is collocated with a BLUETOOTH (BT) device 104. Both independent wireless networks must share a wireless medium 106.

The WLAN QSTA 102 conforms to the IEEE-802.11e industry standard and therefore operates in the 2.400-2.4835 and 5.725-5.850 GHz radio spectrum over a radio link 108. The BT device 104 conforms to the IEEE-802.15.1 industry standard and therefore operates in the 2.400-2.480 GHz radio spectrum over a radio link 110. Their collocation with each other and overlapping frequencies of operation predisposes them to mutual interference when they try to simultaneously access the wireless medium 106. If they do collide, backoff procedures are used to get a clear channel, and such backoff periods waste time that could be used exchanging data.

Potential co-interference between a WLAN basic service set (BSS) 112 and a BLUETOOTH piconet 114 is more organized because it is controlled and limited. Admission controls inherent in the IEEE-802.11e industry standard are used to effectively reserve time slots in which the BSS 112 network will be quiet so the BT piconet 114 can confidently access the wireless medium 106 and make error-free dataframe transfers. In FIG. 1, BSS 112 includes a QoS access point (QAP) 116 and a hybrid controller (HC) 118, and BT piconet 114 includes a master/slave 120.

When BT device 104 needs to send some traffic to the piconet 114, it issues a request-to-send (RTS) 122 to the QSTA 102. A set of BLUETOOTH traffic specification parameters (BT-TSPEC) 123 is stored in the QSTA 102.

An add traffic stream (ADDTS) 124 is transmitted over WLAN radio link 108 to the QAP 116. If the priority and access can be accommodated, a transmit opportunity (TXOP) 126 is returned to the QSTA 102. A clear-to-send (CTS) 128 is sent to the BT device 104 and it can thereafter transmit BT signals in the reserved times. The BSS 112 will be quiescent to allow the BT traffic.

A conventional IEEE-802.11e delete traffic stream (DELTS) 129 request frame is communicated to the QAP 116 to teardown the BLUETOOTH access. The next BLUETOOTH traffic is then established with another ADDTS 124 and corresponding TXOP 126.

In BT piconet 114, a baseband resource manager is responsible for BT access to the radio medium 106. The baseband resource manager grants time on the physical channels to all of the entities that have negotiated an access contract. It also negotiates access contracts that are commitments to provide a user application with an expected performance. The access contract and scheduling function control the use of the BLUETOOTH radio, e.g., the normal exchange of data between connected devices over logical links, and logical transports, as well as the use of the radio medium to carry out inquiries, make connections, be discoverable or connectable, or to take readings from unused carriers during the use of adaptive frequency hopping mode. Sometimes, the scheduling of a logical link results in changing to a different physical channel from the one that was previously used, e.g., due to involvement in a scatternet, a periodic inquiry function, or page scanning. When the physical channels are not time slot aligned, the resource manager also accounts for the realignment time between slots on the original physical channel and slots on the new physical channel.

A BT link controller is responsible for the encoding and decoding of BLUETOOTH packets from the data payload and parameters related to the physical channel, logical transport and logical link. The link controller carries out the link control protocol signaling, in conjunction with the scheduling function of the resource manager. A radio frequency (RF) block 130 is responsible for transmitting and receiving packets of information on the physical channel. A baseband control allows baseband control of the timing and frequency carrier of the RF block 130. The RF block 130 transforms data streams between the physical channel and the baseband into the required formats.

The responsibility of allocating TXOP's 126 is that of the QAP 116. The QAP 116 determines if each requested TXOP 126 time can be allocated to the requesting QSTA 102. Once allocated, the method used by STA's like QSTA 102 to grab the medium 106 and use its amount of TXOP 126 is a part of the QoS facility defined in IEEE-802.11e Standard. It is not guaranteed that other STA's in the BSS 112 can or will monitor the TXOP 126 allocation of a specific QSTA 102 in the BSS 112.

Once allocated a TXOP 126 for the BT piconet 114, the QSTA 102 (really BT device 104) must adhere to its boundaries. The QAP 116 can note any violations and take corrective action against the offending QSTA 102, but such action is not described or mandated by the standard. The QSTA 102 or the QAP 116 has the added responsibility of reserving the medium so that any other STA's in the BSS 112 know of the TXOP 126 reservations. These are explicit actions defined by the Standard.

Although other STA's do not necessarily monitor the issuing of TXOP's 126, they do receive notification that a certain duration has been reserved for a QSTA, and each observes the appropriate boundaries of the reservation by not transmitting during the relevant time period.

The local QSTA 102 has an RF stage in its PHY layer 132 that has to be squelched off during the time the BT device 104 is being allowed to access radio medium 106. The QSTA 102 RF has to be squelched off so its WLAN link 108 carriers don't interfere with the BT link 110. By transmitting a schedule for the BT traffic, the QSTA 102 makes sure that the QAP 116 also does nothing towards the QSTA 102 during the BT TXOP 126. It will itself only allow BT traffic during this quiet period. The BT transmission power levels will not typically interfere with BSS transmissions in other parts of the BSS 112. The BT traffic therefore does not depend on blocking other QSTA's in the BSS 112. The QSTA 102 with the BT port only needs to block the QAP 116 from transmitting WLAN traffic to itself, and it must not transmit any WLAN traffic during the times reserved to the BT described in the TXOP 126. In this case, nothing else need be known to the other QSTA's in the BSS. A specific scheduled TXOP can be given by the QAP 116 to the QSTA 102, e.g., by a RTS/CTS reservation mechanism. The QSTA 102 can then become quiet to allow the BT piconet 114 to take over.

Figure 2:
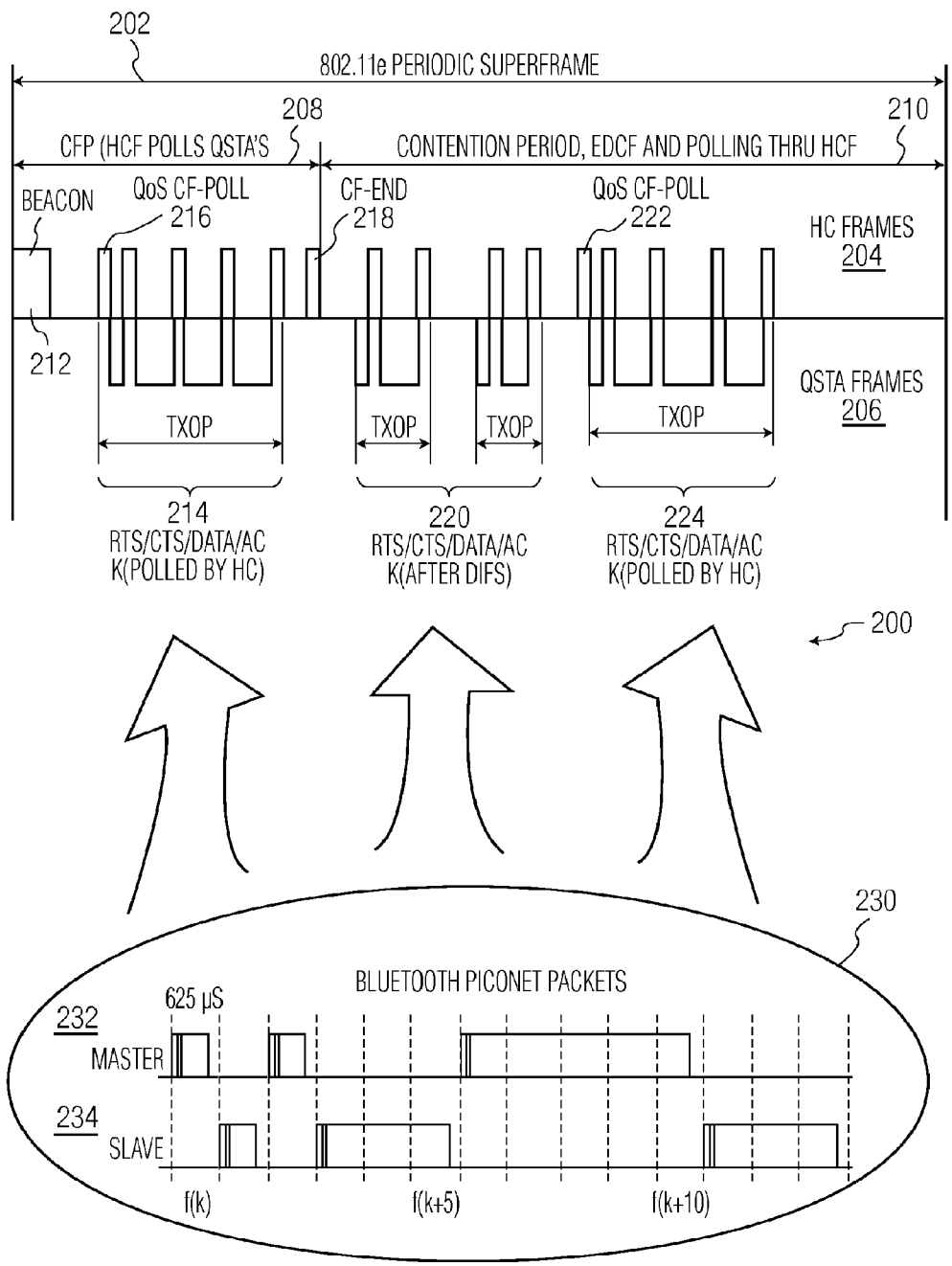
FIG. 2 is a diagram showing how BLUETOOTH wireless media accesses are scheduled into the IEEE-802.11e superframes using transmit opportunity (TXOP) grants from the access point.

FIG. 2 represents a data exchange format embodiment of the present invention useful in wireless hand-held device 100, and is referred to herein by the general reference numeral 200. Format 200 uses an IEEE-802.11e superframe 202 with HC frames 204 and QSTA frames 206. These are respectively transmitted, e.g., by QAP 116 and QSTA 102 in FIG. 1. The superframe 202 has a first part, a contention free period (CFP) 208, wherein a hybrid coordination function (HCF) polls the QSTA's. A second part, a contention period (CP) 210 provides for EDCF and polling through the HCF. Each superframe 202 is heralded by a beacon 212 through which synchronization is established by the BSS 112. A first TXOP 214 responds to a QoS CF-poll 216. The period end is marked by a CF-end 218. TXOP's 220 use access categories to contend for priority with other QSTA's. A QoS CF-poll 222 begins TXOP 224 polling by the HC 118.

Once the BT device 104 gets a TXOP 126 granted, a BT exchange 230 can commence between a master 232 and a slave 234, e.g., BT device 104 and 120 over piconet 114. These can be binned to occur in any of TXOP's 214, 220, and 224. The TXOP 126 defines an interval of time when the BT device 104 has the right to initiate transmissions, e.g., by a starting time and a maximum duration. TXOP's are allocated by contention (EDCF-TXOP) or granted through HCF (polled-TXOP). The duration of EDCF-TXOP's is limited by a QBSS TXOP limit announced in the beacon frames, while the duration of a polled TXOP is specified by the duration field inside the poll frame.

Referring to FIGS. 1 and 2, a protocol embodiment of the present invention provides for scheduling silence periods on a wireless medium to accommodate conflicting traffic patterns in otherwise independent wireless networks, e.g., piconet 114 and BSS 112. Medium time on the shared wireless media 106 is reserved according to BLUETOOTH traffic specifier (BT-TSPEC) 123 defined at the media access control (MAC) level 103 with add traffic stream (ADDTS) 124 and delete traffic stream (DELTS) 129 management frames. The BT-TSPEC 123 is mapped to a priority access category (AC), e.g., voice AC as defined in IEEE-802.11e. The BLUETOOTH traffic periods are scheduled with a power save multiple poll (PSMP) duration for uplink traffic. The IEEE-802.11 type request-to-send and clear-to-send (RTS/CTS) mode is initiated at the start of an uplink phase of the PSMP duration. Such prevents QAP 116 from sending a PSMP recovery frame. BLUETOOTH traffic can be conducted in the independent wireless network, piconet 114, according to reserved media times outlined in a transmit opportunity (TXOP) 126 issued by the QAP 116 in response to receiving the ADDTS 124 and DELTS 129 management frames. The QAP 116 then allows what seems to be an inactive medium 106 for scheduled accesses by the WLAN QSTA's 102. Changes in BLUETOOTH traffic requirements can be recognized and accommodated. The BT-SPEC 123 is torn-down when BLUETOOTH traffic requirements have changed, and a new BT-SPEC 123 is established for the new BLUETOOTH traffic requirements.

Prioritized channel access is realized with TC QoS parameters, which include ATFS[TC], CWmin[TC], and PF[TC]. The QoS parameters can be adapted over time by the HC, and will be announced periodically via beacon frames. Protocol-related parameters are included in the beacon frame, transmitted at the beginning of each superframe. The HCF extends the EDCF access rules. The HC may allocate TXOPs to itself to initiate MAC service data unit (MSDU) Deliveries whenever it wants, however, only after detecting the channel as being idle for PIFS, which is shorter than DIFS. To give the HC priority over the EDCF, ATFS must be longer than PIFS and can therefore not have a value smaller than DIFS. During CP, each TXOP begins either when the medium is determined to be available under the EDCF rules, e.g., after AIFS plus backoff time, or when the station receives a special poll frame, the QoS CF-Poll, from the HC. The QoS CF-Poll from the HC can be sent after a PIFS idle period without any backoff. Therefore the HC can issue polled TXOPs in the CP using its prioritized medium access. During the CFP, the starting time and maximum duration of each TXOP is specified by the HC, using the QoS CF-Poll frames. Stations will not attempt to get medium access on its own during the CFP, so only the HC can grant TXOPs by sending QoS CF-Poll frames. The CFP ends after the time announced in the beacon frame or by a CF-End frame from the HC.

The HC polls stations for MSDU Delivery. For this, the HC requires information that has to be updated by the polled stations from time to time. Controlled contention is a way for the HC to learn which station needs to be polled, at which times, and for which duration. The controlled contention mechanism allows stations to request the allocation of polled TXOPs by sending resource requests, without contending with other EDCF traffic. Each instance of controlled contention occurs during the controlled contention interval, which is started when the HC sends a specific control frame. This control frame forces legacy stations to set their NAV until the end of the controlled contention interval, thus they remain silent during the controlled contention interval. The control frame defines a number of controlled contention opportunities, e.g., short intervals separated by SIFS, and a filtering mask containing the TCs in which resource requests may be placed. Each station with queued traffic for a TC matching the filtering mask chooses one opportunity interval and transmits a resource request frame containing the requested TC and TXOP duration, or the queue size of the requested TC. For fast collision resolution, the HC acknowledges the reception of request by generating a control frame with a feedback field so that the requesting stations can detect collisions during controlled contention.

Unlike IEEE-802.11a and IEEE-802.11b DCF, where all stations try to access the wireless medium with the same priority, the IEEE-802.11e EDCA has four levels of priority implemented in four access controllers (AC's), e.g., voice, video, best effort, and background. The BT device 104 is connected to trigger one of the highest priority AC's, e.g., voice or video, into granting access for a traffic stream (TS). The BT device 104 does not actually send its data through the WLAN, but schedules the time so it can access the wireless medium 106 itself directly. The WLAN QSTA must be squelched off during these scheduled times.

The EDCA parameter set associated with each AC defines the medium access priority by setting individual inter-frame spaces, contention windows, and other additional parameters per AC. The mechanism for listening to the medium and the hack-off mechanism, to determine the required transmission times, is similar to the mechanism defined by DCF. However, unlike DCF, the maximum back-off times differ for the various ACs. This means that higher-priority ACs have a shorter maximum back-off time than lower-priority ACs. The shorter maximum back-off time allows the higher-priority AC to gain access to the wireless medium more frequently than the lower-priority AC.

Once a device has gained access to the wireless medium, it has the opportunity to continue transmitting for a specified TXOP. Applications or packets that share the same AC also have the same maximum back-off time and, hence, the same chance to gain access to the wireless medium. EDCA cannot guarantee latency, jitter or bandwidth, and has no means to handle several applications with the same priority level.

Admission control is negotiated by the use of a TSPEC. A station specifies its traffic flow requirements (data rate, delay bounds, packet size, and others) and requests the QAP to create a TSPEC by sending the ADDTS (add TSPEC) management action frame. The QAP calculates the existing load based on the current set of issued TSPECs. Based on the current conditions, the QAP may accept or deny the new TSPEC request. If the TSPEC is denied, the high priority access category inside the QSTA is not permitted to use the high priority access parameters, but it must use lower priority parameters instead. Admission control is not intended to be used for the "best effort" and "background" traffic classes.

It may also be helpful in implementing embodiments of the present invention to understand BLUETOOTH technology more fully. The BLUETOOTH protocol allows data to be transferred between one master and up to seven slaves (in a PAN or "piconet") at rates of up to 723-kbit/s. However, the actual data payload is usually reduced due to communications protocol overheads defining the type of each unit with address, and other BLUETOOTH device compatibility header information. A Gaussian Frequency Shift Keying (GFSK) modulation scheme with eighty-three, 1-Mbit/s channels within the 2.4 GHz band is used. GFSK applies Gaussian filtering to the modulated baseband signal before it is applied to the carrier. This results in a "dampened" or gentler frequency swing between the high ("1") and low ("0")

levels. The result is a narrower and "cleaner" spectrum for the transmitted signal compared with Frequency Shift Keying (FSK).

Since BLUETOOTH operates on the same license-free ISM band as other wireless technologies, e.g., Wi-Fi, the interference often limits data rates because any corrupted packets need to be re-transmitted. Version 1.2, however, tries to address this problem with Adaptive Frequency Hopping (AFH). AFH allows two communicating BLUETOOTH devices to constantly change their channel frequency in the band to avoid clashes with other RF devices in the area. BLUETOOTH is available in three basic power levels: Class-1 (100 m line of sight range), Class-2 (10 m), and Class 3 (2-3 m). Most contemporary consumer devices are Class-2. The devices in a BLUETOOTH piconet each have a unique 48-bit identity number.

A first BLUETOOTH device identified becomes the master, and sets the 1600 frequencies to be used each second across the band. All other devices in the piconet "lock" or synchronize to this sequence. The master transmits in even slots, the slave responds in odd slots. Active slave devices in the piconet are assigned an address, and listen for slots addressed to themselves. Slaves may also go into lower power "sniff", "hold" or "park" modes. In sniff mode a device listens only periodically, during specific sniff slots, but does retain the synchronization. In hold, a device listens only to determine if it should become active. In park, a device gives up its address. Although hold and park modes extend battery life, it does mean the device loses synchronization for at least 1600 hops and has to wait for a new link to be set up. This can take several seconds and is a drawback when the user requires a constant fast response. The BLUETOOTH standard includes a range of "profiles" which you can select to target your development. All BLUETOOTH applications must, however, be certified for compliance with the standard and all users must be members of the BLUETOOTH Special Interest Group.

TSPEC allows a station to specify its traffic flow requirements (data rate, delay bounds, packet size, and others) and requests the QoS access point (QAP) to create a TSPEC by sending an ADDTS (add TSPEC) management action frame. The QAP then calculates the existing load, based on the current set of issued TSPECs.

The QAP can accept or deny the new TSPEC request, based on current conditions. If the TSPEC is denied, the high priority access category inside the QoS station is not permitted to use the high priority access parameters, but it must use lower priority parameters instead.

Various conventional IEEE-802.11e mechanisms can be used to reserve time for the BLUETOOTH traffic over the wireless access medium 106. a Traffic Specifier (TSPEC) that is defined at the MAC level.

Reserving BLUETOOTH medium time with an IEEE-802.11e-type MAC level traffic specifier (TSPEC) using add traffic stream (ADDTS) and delete traffic stream (DELTS) management frames. Mapping the BLUETOOTH TSPEC to an access category.

Use of the ADDTS and DELTS management frames defined in the IEEE-802.11e standard to perform the medium reservation for the BLUETOOTH traffic.

Mapping of the BLUETOOTH TSPEC to an Access Category. For this purpose the following scheme could be used.

Use of the existing voice category as defined in IEEE-802.11e for the access category of the BLUETOOTH traffic. In case there was a conflict in medium usage, based on the jitter tolerance of the WLAN voice category, arbitration could be applied to schedule the BLUETOOTH traffic with higher priority or vice-versa.

Utilization of the Power Save Multiple Poll (PSMP) Durations for Uplink Traffic to schedule the BLUETOOTH traffic periods.

Initiation of the RTS/CTS scheme by the STA at the start of the Uplink Phase of the PSMP duration in order to prevent the Access Point (AP) from sending a PSMP recovery frame.

Utilization of the granted WLAN reservation periods for BLUETOOTH traffic. This period is typically characterized as a quiet period on the medium as perceived by the stations that belong to the WLAN network. Since it is a scheduled access for the STA for a specific traffic stream, the AP is able to understand the inactive medium.

In order for the collocated BLUETOOTH device to transmit error-free frames, the WLAN device must defer any transmissions on the medium that would potentially collide with the BLUETOOTH traffic, and vice versa. Each BLUETOOTH device establishes its need to transmit using internal data queues. A priority signal is used to determine the isochronous nature of the pending transmission. This is a part of the PTA signaling scheme that is already in existence.

The mutual arbitration between the devices respects the high priority signal and defers its transmission based on an agreed upon condition for conflict resolution in case of simultaneous priority requests.

Typically, the PTA algorithm uses methods to reserve the medium for WLAN and BLUETOOTH traffic using a hardware signaling method. This reservation scheme pre-supposes that the quiet period of the WLAN Station will be sufficient to take care of the asynchronous and isochronous BLUETOOTH traffic. However the IEEE-802.11n standard defines aggregated transfers of MAC Service Data Units and MAC Protocol Data Units. The transmission and reception of these aggregate frames at lower limits of the supported rate set results in active WLAN transmission and reception windows, on the medium, that are of the order of a few milliseconds.

BLUETOOTH isochronous transfers allow quiet periods that are 2.5 milliseconds or less. With these quiet period durations, it becomes increasingly difficult to accommodate the transfer of error free IEEE-802.11n frames while BLUETOOTH traffic is ongoing or vice-versa. This results in a larger number of retrials on the medium and the corresponding inefficiencies in the medium utilization.

A method embodiment of the present invention recognizes changes in BLUETOOTH traffic requirements, and subsequently tears down the BLUETOOTH TSPEC to establish a new TSPEC to accommodate the changed BLUETOOTH traffic pattern.

When the WLAN device, QSTA 102, is made aware that the collocated BT device 104 is powered up and ready to communicate, a BT-TSPEC 123 is setup with the BLUETOOTH scheduling parameters, e.g., as represented in Table-I.

TABLE I

Traffic Type: Periodic
TSID: any value between 8-15
Direction: 00(Unidirectional)
Access Policy: HEMM
Aggregation: 0
APSD: 1(Required by PSMP)
User Priority: 6/7
TSInfoAckPolicy: bit15: bit14:: 01
Schedule: 0
Bit17: Dummy xfer_type (New Bit definition)

TABLE I-continued

Nominal MSDU Size: 0
Maximum MSDU Size: 0
Minimum Service Interval: 3.75 ms (625*6)
Maximum Service Interval: 3.75 ms (625*6)
Inactive Interval: 10 secs
Suspension Interval: 4294967295
Service Start Time: 0 unspecified
Minimum Data Rate: 64 kbps
Mean Data Rate: 80 kbps
Peak Data Rate: 96 kbps
Burst Size: 30 octets
Delay Bound: unspecified (WLAN MAC timing—not relevant)
Minimum PHY Rate: 1 Mbit/sec or 6 Mbit/sec
Surplus Bandwidth Allowance: 2.0
Medium Time: (will be allocated by QAP).

The MAC layer of the QSTA 102 initiates TSPEC creation in the WLAN domain. In the case of BLUETOOTH transmissions, TSPEC creation requests do not originate in the application layer in the WLAN domain, so there is no need to indicate any status information to a station management entity (SME) in the WLAN MAC layer of QSTA 102.

Setting up the TS virtual connection ensures that the QoS requirements of an application are accommodated. TS is a set of MSDU's to be transferred subject to the QoS requirements of an application flow to the MAC. The non-AP QSTA SME decides if a TS needs to be created for an application flow and assigns it a traffic stream identity (TSID). The SME generates an MLME-ADDTS.request, a MAC layer management entity request, containing a TSPEC. TSPEC's may also be generated autonomously by the MAC without being initiated by the SME. The SME in the HC decides whether to accept the TSPEC as requested, or to suggest an alternative TSPEC, and sends its response to the requesting non-QAP STA.

Once a request for TS setup is accepted, a traffic stream is created, identified within the non-AP QSTA by the TSID and a direction assigned to it. In the HC at QAP, the same TS is identified by a combination of TSID, direction and non-AP QSTA address. The TSID is assigned to an MSDU in the layers above the MAC in the QAP containing the HC. Once traffic arrives at QAP, a traffic classification (TCLAS) specifies certain parameters to identify the MSD Us belonging to a particular TS. The classification is performed above the MAC SAP at a QAP. The QAP uses the parameters in the TCLAS elements to filter the MSDUs belonging to a TS so that they can be delivered with the QoS parameters that have been set up for the TS. Traffic classification could also take place at non-AP QSTA with multiple streams, however, it is beyond the scope of the draft standard. TSPEC coordinates resource reservation within an HC and is also responsible for its scheduling policy. The Traffic Specification allows a more extensive set of parameters than may be needed, or may be available, for any particular instance of parameterized QoS traffic. It also allows other parameters to be specified that are associated with the traffic stream, such as traffic classifier and ACK policy. TSPECs are constructed at the station management entity (SME), from application requirements supplied via the SME, and with information specific to the MAC layer.

A QoS Control field in the MAC frame format facilitates the description of the QoS requirements for a particular application flow. It is a 4-bit field that identifies the traffic category (TC) or TS to which a frame belongs and various other QoS-related information about the frame that varies by frame type and subtype. Bits 0-3 are used as traffic identifier (TED). TTD is a value used by higher-layer entities to distinguish MSDUs to MAC entities that support QoS within the MAC data service. There are sixteen possible TID values, eight of them identify TCs (0-7) and the other eight identify parameterized TSs (8-15) and are assigned traffic stream identities (TSIDs). The TID is assigned to an MSDU in the layers above the MAC. Each QSTA has four queues (ACs) and supports 8 UPs as defined in IEEE-802.1D. These priorities vary 0-7 and are identical to IEEE IEEE-802.1D priority tags. An MSDU with a particular UP belongs to a TC with that UP.

QoS using HCF: Designed for parameterized QoS support, HCF can start the controlled channel access mechanism in both contention-free period (CFP) and contention-period (CP) intervals. During the CP, a new contention-free period named controlled access phase (CAP) is introduced which is the combination of several intervals during which frames are transmitted using HCF-controlled channel access (HCCA) mechanisms. The QAP scheduler computes the duration of polled-TXOP (transmission opportunity) for each QSTA based upon the TSPEC parameters of an application flow. The scheduler in each QSTA then allocates the TXOP for different TS queues according to priority order. Similar to the process as in FIG. 4, frames with TID values from 8 to 15 are mapped into eight TS queues using HCF controlled channel access rules. The reason for separating TS queues from AC queues is to support strict parameterized QoS at TS queues whereas prioritized QoS is supported at AC queues.

Figure 3:
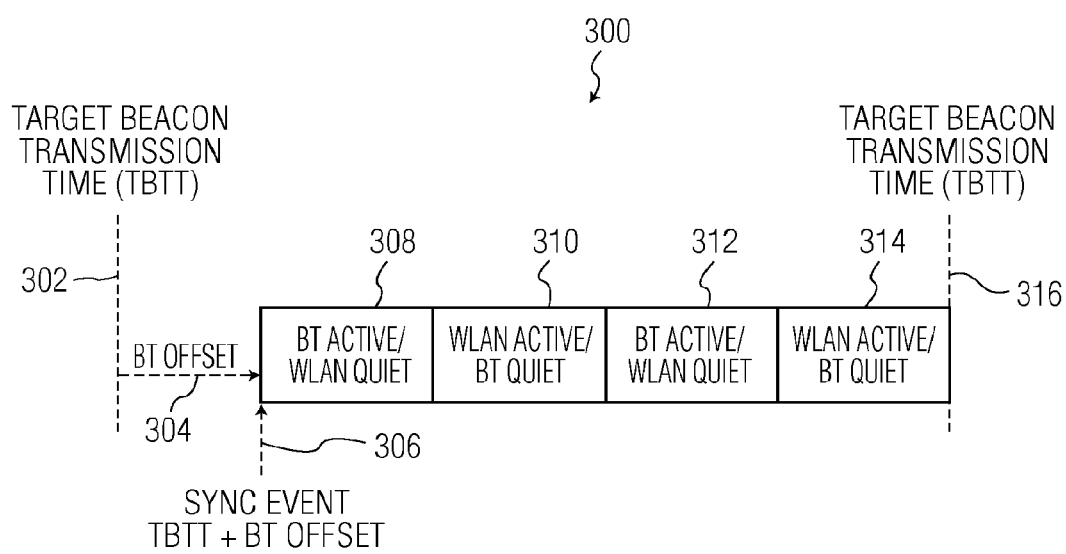
FIG. 3 is a timing diagram showing how a target beacon transmission time and offset communicated in a management frame can be used to synchronize otherwise independent BLUETOOTH and WLAN activity.

FIG. 3 diagrams how a distributed coordination function (DCF) 300 can work for scheduling silence periods on a wireless medium to accommodate conflicting traffic patterns in otherwise independent wireless networks. DCF 300 includes a target beacon transmission time (TBTT) 302, a BLUETOOTH offset (BT-offset) time 304, and a synchronizing event 306. For two repetitions, there will be a BT active and WLAN quiet period 308, a WLAN active and BT quiet period 310, a BT active and WLAN quiet period 312, and a WLAN active and BT quiet period 314. The superframe ends with a next TBTT 316.

A management frame is used to coordinate the two independent wireless networks. It is sent from a client station (STA), e.g., QSTA 102 (FIG. 1), to an access point (AP), e.g., QAP 116, in a wireless local area network (WLAN) to schedule WLAN silence periods for BLUETOOTH activity. A start event field in the management frame defines a BLUETOOTH transmission starting time, in terms of WLAN target beacon transmission time, TBTT 302. A quiet duration field in the management frame defines an active transmission time to allow BLUETOOTH isochronous traffic. A synchronizing event field in the management frame, sync event 306, provides for WLAN beacon frame timing with an offset timing value. A repeat count sets how many quiet-followed-by-active sequences of BLUETOOTH-active/WLAN-silent and WLAN-active/BLUETOOTH-silent periods 308-314 will be used. Co-interference and conflicting traffic patterns in otherwise independent wireless networks are reduced so as to improve medium efficiency in collocated devices.

Power save multiple poll (PSMP) durations for uplink traffic can be used to schedule BLUETOOTH traffic periods. PSMP is an advanced power save capability that allows hand-held devices to conserve power by scheduling activity on the wireless medium, rather than sending/receiving at random intervals to accommodate other clients. It's useful where many (20+) handhelds are associated to a single Basic Service Set. PSMP schedules when a hand-held (HH) device needs to be awake to receive a transmission and when it can transmit a frame. At all other times, the HH device's Wi-Fi block can "sleep," thereby extending battery life. The PSMP protocol requires that both the AP and the station support the so-called Greenfield Preamble.

An Access Point (AP) can be prevented from sending a PSMP recovery frame if the request-to-send/clear-to-send (RTS/CTS) scheme is initiated by the STA at the start of the Uplink Phase of the PSMP duration.

The WLAN reservation periods granted can be used for BLUETOOTH traffic. Such periods are typically quiet periods on the medium, as perceived by the stations belonging to the WLAN network. Since it is a scheduled access for the STA for a specific traffic stream, the AP is able to understand the inactive medium.

Figure 4:
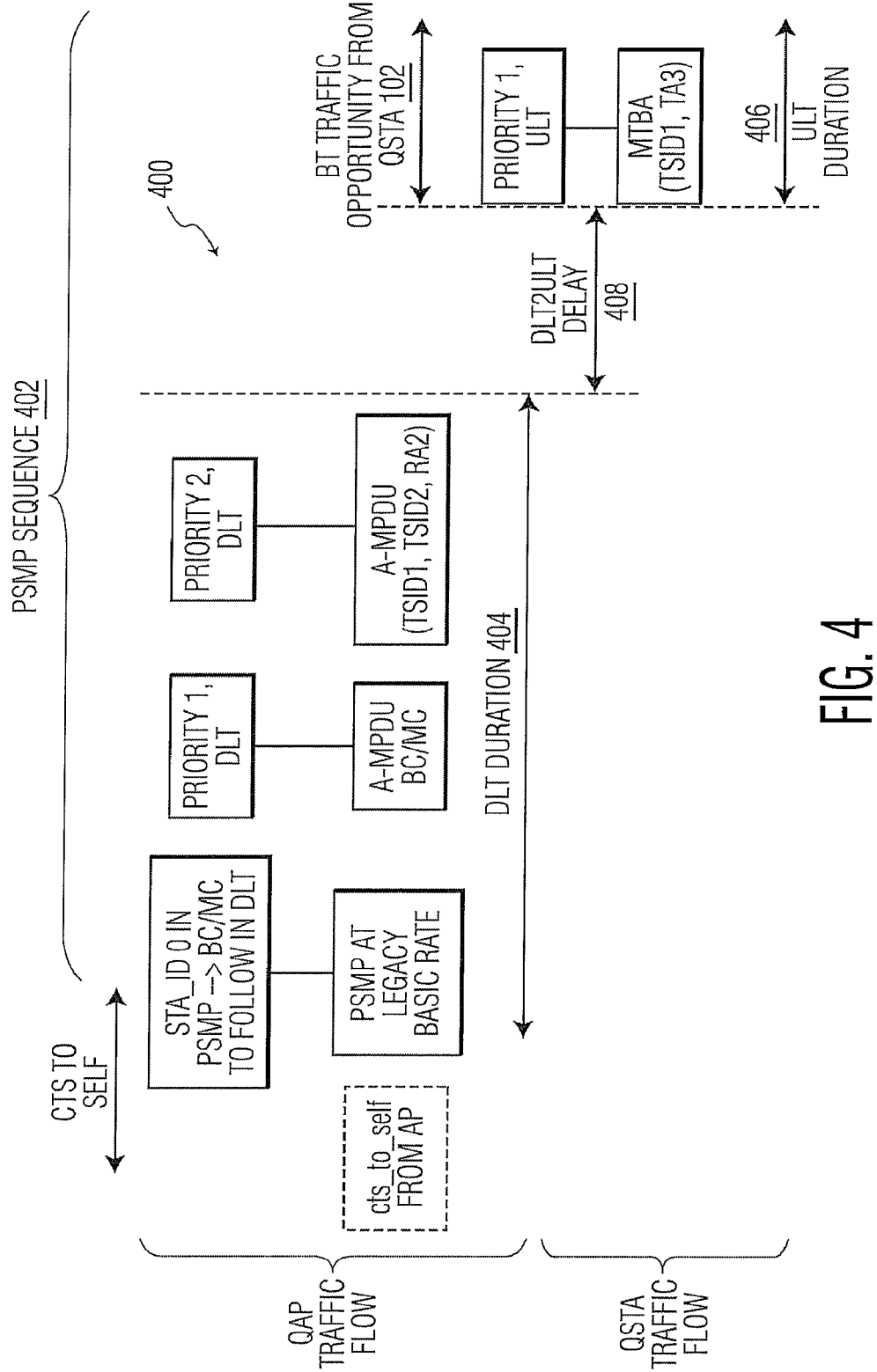
FIG. 4 is a timing diagram showing how a BLUETOOTH master/slave can be allowed to be active while a collocated local WLAN QSTA is being silent in its cooperation with a scheduled PSMP sequence that involves other QSTA's.

FIG. 4 shows a PSMP method embodiment of the present invention, and is referred to herein by the general reference numeral 400. Table-II presents a typical PSMP schedule for consideration with the example in FIG. 4. A PSMP sequence 402 comprises a down-link transmission (DLT) duration 404 where QAP 116 transmits, an uplink transmission (ULT) duration 406 where the clients stations (QSTA's) transmit, and a separation DLT2ULT delay 408. When BSS 112 is engaged for the duration of a PSMP sequence 402, there is a window of opportunity open for BT master/slave 104 to safely make transmissions. A client station, e.g., QSTA 102 in FIG. 1, that is otherwise expected to be inactive during its part of the PSMP duration, can give BT master/slave 104 a transmit opportunity signal. BLUETOOTH traffic 110 can be exchanged without intervening with other active parts of the BSS 112. Such is an opportunistic use of medium 106 for the PSMP duration, a time that is not required by the QSTA 102 because the other scheduled QSTA's in the BSS are active.

TABLE II

PSMP Schedule 1

| STAID | TSID | DLT schedule | ULT schedule | scheduling heuristics |
|---|---|---|---|---|
| 0 | broadcast and multicast frames present | 1 | | BC/MC transmitted first |
| RA2 (QSTA 102) | TSID1 (8) | 2 | | after traffic transmission |
| | TSID2 (9) | 2 | | but maintain DLT2ULT delay |
| TA3 | TSID1 (8) | | 1 | schedule STA3 to be closest to its DLT, minimize off times |
| | TSID2 (9) | | 1 | but maintain DLT2ULT delay |

In general, after a PIFS wait time, an AP may gain access to the medium to start transmission of PSMP sequence that includes a PSMP frame followed by DLT and ULT periods. Each STA is required to be on receive during its scheduled DLT. STA's start transmitting at the start of its corresponding ULT offset without needing to do a CCA. STA's which updated their NAV's in response to the PSMP frame can transmit frames during DLT and ULT periods corresponding to their AID of BSS mode or MAC address of IBSS mode as described in the PSMP frame which caused the NAV update to occur. The NAV value is not reset and is not suspended during the DLT and ULT periods, but continues to count down. Additional NAV updates may occur due to the reception of other frames not directed toward the receiving STA during the DLT and ULT periods. The STA which transmits a PSMP frame generates a PSMP TXOP with duration of the value of the Duration/ID field of the transmitted PSMP frame.

The AP may gain control of the channel whenever the channel remains idle for at least a PIFS time from the ULT duration start. The AP may transmit a PSMP-recovery frame if the currently scheduled ULT duration is longer than the total time of PSMP-recovery frame plus PIFS. The PSMP-recovery frame will modify the schedule of the currently scheduled STA only. The schedule of other STAs will remain unchanged. The PSMP-recovery frame may include: (a) a modified ULT (and/or DLT) for the currently scheduled STA by adjusting the time remaining after PIFS and PSMP-recovery frame and (b) unmodified ULTs (and/or DLTs) for other STAs being originally scheduled after this ULT in the PSMP sequence. The ULT (or DLT) Start Offset is specified relative to the end of the PSMP-recovery frame to compensate for the time already lapsed. If the currently scheduled ULT duration is shorter than the total time of PSMP-recovery frame plus PIFS, no PSMP-recovery frame will be transmitted.

While the present invention has been described with reference to several particular example embodiments, those skilled in the art will recognize that many changes may be made thereto without departing from the spirit and scope of the present invention, which is set forth in the following claim.

The invention claimed is:

1. A communication system, comprising:
an IEEE-802.11e type wireless local area network (WLAN) quality-of-service (QoS) client station (QSTA);
an IEEE-802.15.1 type (BLUETOOTH) device collocated with the QSTA and sharing some of the same wireless medium channels in the 2.4 GHz radio spectrum;
means for describing a BLUETOOTH device exchange in terms of an add traffic stream (ADDTS) request that can be generated by the QSTA and transmitted to a QoS access point (QAP) and for receiving a transmit opportunity (TXOP); and
means for quieting said QSTA so the BLUETOOTH device can use said wireless medium channels according to parameters and limits described by said ADDTS and resulting said TXOP;
wherein, BLUETOOTH traffic is allowed an access category (AC) in the QSTA, but the QSTA itself does not handle the BLUETOOTH traffic and is kept off the wireless medium channels so the BLUETOOTH device can complete error-free messages without local interference.

2. A method for operating a wireless device with collocated WLAN and BLUETOOTH stations, comprises
using a MAC layer of a QoS station (QSTA) to generate a traffic specification (TSPEC) in the WLAN domain, and for BLUETOOTH transmissions, such TSPEC creation request does not originate in an application layer in the WLAN domain, and there is no need to indicate any status information to a station management entity (SME) by the WLAN MAC layer.

3. A method for collocating and operating WLAN and BLUETOOTH stations to share a wireless access medium, comprising:
using a medium access control (MAC) layer of a QoS client station (QSTA) to generate a traffic specification (TSPEC) in a WLAN basic service set (BSS);
requesting a QoS access point (QAP) in said BSS to accommodate BLUETOOTH traffic as if it were a supported traffic stream; and
transmitting said BLUETOOTH traffic according to parameters specified in a transmit opportunity (TXOP) issued by said QAP;

wherein, collisions between WLAN traffic and BLUETOOTH traffic are reduced, and wireless access medium efficiency is improved thereby.

4. The method of claim 3, further comprising:
generating an add traffic stream (ADDTS) with parameters suited to said BLUETOOTH traffic in said QSTA at a request to send (RTS) made by a collocated BLUETOOTH master/slave.

5. The method of claim 4, further comprising:
returning a clear-to-send (CTS) signal from said QSTA to said collocated BLUETOOTH master/slave to allow said BLUETOOTH traffic to operate according to said TXOP.

6. The method of claim 3, further comprising:
generating delete traffic stream (DELTS) to teardown a TSPEC if BLUETOOTH traffic conditions change.

7. A communication system, comprising:
an IEEE-802.11e type wireless local area network (WLAN) quality-of-service (QoS) client station (QSTA);
an IEEE-802.15.1 type (BLUETOOTH) device collocated with the QSTA and sharing some of the same wireless medium channels in the 2.4 GHz radio spectrum;
an circuit that describes a BLUETOOTH device exchange in terms of an add traffic stream (ADDTS) request that can be generated by the QSTA and transmitted to a QoS access point (QAP) and for receiving a transmit opportunity (TXOP); and
an circuit that quiets said QSTA so the BLUETOOTH device can use said wireless medium channels according to parameters and limits described by said ADDTS and resulting said TXOP;
wherein, BLUETOOTH traffic is allowed an access category (AC) in the QSTA, but the QSTA itself does not handle the BLUETOOTH traffic and is kept off the wireless medium channels so the BLUETOOTH device can complete error-free messages without local interference.

8. A device with collocated WLAN and BLUETOOTH stations that share a wireless access medium, comprising:
an circuit that uses a medium access control (MAC) layer of a QoS client station (QSTA) to generate a traffic specification (TSPEC) in a WLAN basic service set (BSS);
an circuit that requests a QoS access point (QAP) in said BSS to accommodate BLUETOOTH traffic as if it were a supported traffic stream; and
an circuit that transmits said BLUETOOTH traffic according to parameters specified in a transmit opportunity (TXOP) issued by said QAP.

9. The device of claim 8, further comprising:
an circuit for generating an add traffic stream (ADDTS) with parameters suited to said BLUETOOTH traffic in said QSTA at a request to send (RTS) made by a collocated BLUETOOTH master/slave.

10. The device of claim 9, further comprising:
an circuit for returning a clear-to-send (CTS) signal from said QSTA to said collocated BLUETOOTH master/slave to allow said BLUETOOTH traffic to operate according to said TXO.

* * * * *